US009712608B2

(12) United States Patent
Shukla et al.

(10) Patent No.: US 9,712,608 B2
(45) Date of Patent: Jul. 18, 2017

(54) ELASTICALLY SCALABLE DOCUMENT-ORIENTED STORAGE SERVICES

(71) Applicant: Microsoft Corporation, Redmond, WA (US)

(72) Inventors: Dharma Shukla, Bellevue, WA (US); Madhan Gajendran, Bellevue, WA (US); Quetzalcoatl Bradley, Monroe, WA (US); Shireesh Kumar Thota, Issaquah, WA (US); Karthik Raman, Issaquah, WA (US); Mark Connolly Benvenuto, Seattle, WA (US); John Macintyre, Seattle, WA (US); Nemanja Matkovic, Seattle, WA (US); Constantin Dulu, Redmond, WA (US); Elisa Marie Flasko, Kirkland, WA (US); Atul Katiyar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 701 days.

(21) Appl. No.: 13/830,493

(22) Filed: Mar. 14, 2013

(65) Prior Publication Data

US 2014/0280707 A1 Sep. 18, 2014

(51) Int. Cl.
*G06F 15/16* (2006.01)
*H04L 29/08* (2006.01)

(52) U.S. Cl.
CPC ................ *H04L 67/1006* (2013.01)

(58) Field of Classification Search
CPC ............... H04L 69/329; H04L 67/1023; H04L 67/1095; H04L 67/1006

(Continued)

(56) References Cited

U.S. PATENT DOCUMENTS 5,781,711 A 7/1998 Austin
6,070,191 A * 5/2000 Narendran .............. G06F 9/505
                                                         709/217

(Continued)

OTHER PUBLICATIONS

Tang, et al., "A Self-Organizing Storage Cluster for Parallel Data-Intensive Applications", In Proceedings of the ACM/IEEE conference on Supercomputing. http://202.120.40.15/~jzhou/research/publications/2004_sc04.pdf Published Date: Nov. 2004 pp. 1-13.

*Primary Examiner* — June Sison
*Assistant Examiner* — Dixon Dabipi
(74) *Attorney, Agent, or Firm* — Cooper Legal Group

(57) ABSTRACT

A server set may provide a document service to one or more clients, and may be configured to do so in view of various considerations such as availability, fault tolerance, flexibility, and performance. Presented herein are document service architectures that involve partitioning the document set into at least two document ranges, and configuring respective servers of the server set to host one or more agents to which are respectively assigned one or more document ranges. A request for an operation involving at least one document may be routed to a server hosting an agent managing the document ranges of the documents involved in the operation. Moreover, respective servers may retain detailed information about neighboring servers (e.g., according to a logical or physical proximity) and scant information about distant servers, thereby avoiding both the extensive information exchange of highly informed network architectures and the inefficiency of uninformed routing algorithms.

20 Claims, 9 Drawing Sheets

(58) Field of Classification Search
USPC .......................................................... 709/217
See application file for complete search history.

(56) References Cited

U.S. PATENT DOCUMENTS

| | | | | |
|---|---|---|---|---|
| 6,233,607 | B1* | 5/2001 | Taylor | G06F 9/5016 709/215 |
| 7,792,989 | B2* | 9/2010 | Toebes | H04L 67/1021 709/223 |
| 8,171,125 | B2* | 5/2012 | Gopalakrishnan | H04L 67/06 709/203 |
| 8,935,307 | B1* | 1/2015 | Srinivasan | G06F 17/30194 707/827 |
| 2002/0107935 | A1* | 8/2002 | Lowery | G06F 17/30902 709/216 |
| 2004/0100984 | A1* | 5/2004 | Nam | H04L 12/42 370/438 |
| 2006/0047743 | A1* | 3/2006 | Yuan | G01R 31/31705 709/203 |
| 2012/0166582 | A1* | 6/2012 | Binder | H04L 63/18 709/217 |
| 2012/0198020 | A1* | 8/2012 | Parker | H04W 12/08 709/217 |
| 2012/0233486 | A1* | 9/2012 | Phull | G06F 9/5083 713/375 |
| 2012/0284296 | A1* | 11/2012 | Arifuddin | H04L 67/1027 707/769 |
| 2013/0054808 | A1 | 2/2013 | Hildebrand | |

* cited by examiner

ELASTICALLY SCALABLE DOCUMENT-ORIENTED STORAGE SERVICES

BACKGROUND

Within the field of computing, many scenarios involve the provision of a document service across a set of servers, which may be arranged in a set of one or more clusters. For example, the documents may represent objects of an object-oriented computing environment; records of a database; or messages in a distributed email system. In these and other scenarios, the document service may serve a set of client applications operated by one or more users of the document service.

In such scenarios, the server set may be configured to provide the document service to the one or more users in view of various considerations. As a first example, the document set may be distributed across the server set in various ways. As a second example, the server set may feature various types of replication, where two or more copies of one or more documents are stored by one or more servers, in order to facilitate fault detection and tolerance, availability, and concurrent access by two or more users. As a third example, the servers of the server set may be partitioned into two or more clusters, which may in turn be geographically distributed and/or allocated for particular roles. As a fourth example, the document service may serve discrete sets of documents to two or more clients, and it may be desirable to enforce security policies, such as permitting access of a particular data set to a first user while prohibiting access by a second user. As a fifth example, the document service may involve various types and volumes of communication among the servers regarding the state of the server set, such as the addition, removal, or reconfiguration of various servers. As a sixth example, it may be desirable to configure the server set in a flexible manner, such that changes to the server set may be implemented to adjust these and other characteristics of the server set and the document service.

In view of these considerations, an administrator may choose a configuration of the server set to achieve a combination of such features suitable for the types and uses of the document set. Many such features of the architecture of the servers, such as the network topologies, network communication and routing algorithms, and load-balancing techniques, may contribute to such configuration.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Presented herein are architectures for a server set that may facilitate the provision of a document service having a variety of desirable characteristics. These architectures involve a document set that may be partitioned into two or more document ranges, where each document may be rapidly identified as falling within a particular document range. Each server may host one or more agents, to which are respectively assigned one or more document ranges, such that each agent is responsible for storing and applying operations to the subset of documents falling within the assigned document ranges. Moreover, the servers of the server set may share information about the agents hosted by each server and the document ranges assigned to each agent. A server receiving a request to apply an operation to a document set may determine the document ranges of the documents, and whether or not it is hosting an agent responsible for such document ranges. If so, the server may invoke the agent to apply the operation to the documents; and if not, the server may forward the operation to a second server that is hosting an agent responsible for the document range(s).

In some such configurations, the servers may be arranged in a particular network topology, where, for each server, some servers are (logically and/or physically) proximate to the server ("neighbor" servers), and other servers are (logically and/or physically) distant from the server. For example, the servers may be arranged in a ring topology, and each server may store detailed information about the neighbor servers that are near the server in the ring topology, and may store less detailed information about distant neighbors. This information exchange may enable an efficient balance between less informed routing techniques, where messages may be relayed several times before reaching a suitable server; more informed routing techniques, where routing is rapid but where the servers exchange extensive information about the server set; and centralized routing, where one or more servers may store detailed information about the entire server set, but may also represent points of potential failure of the server set. These and other advantages may be achievable through variations of the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
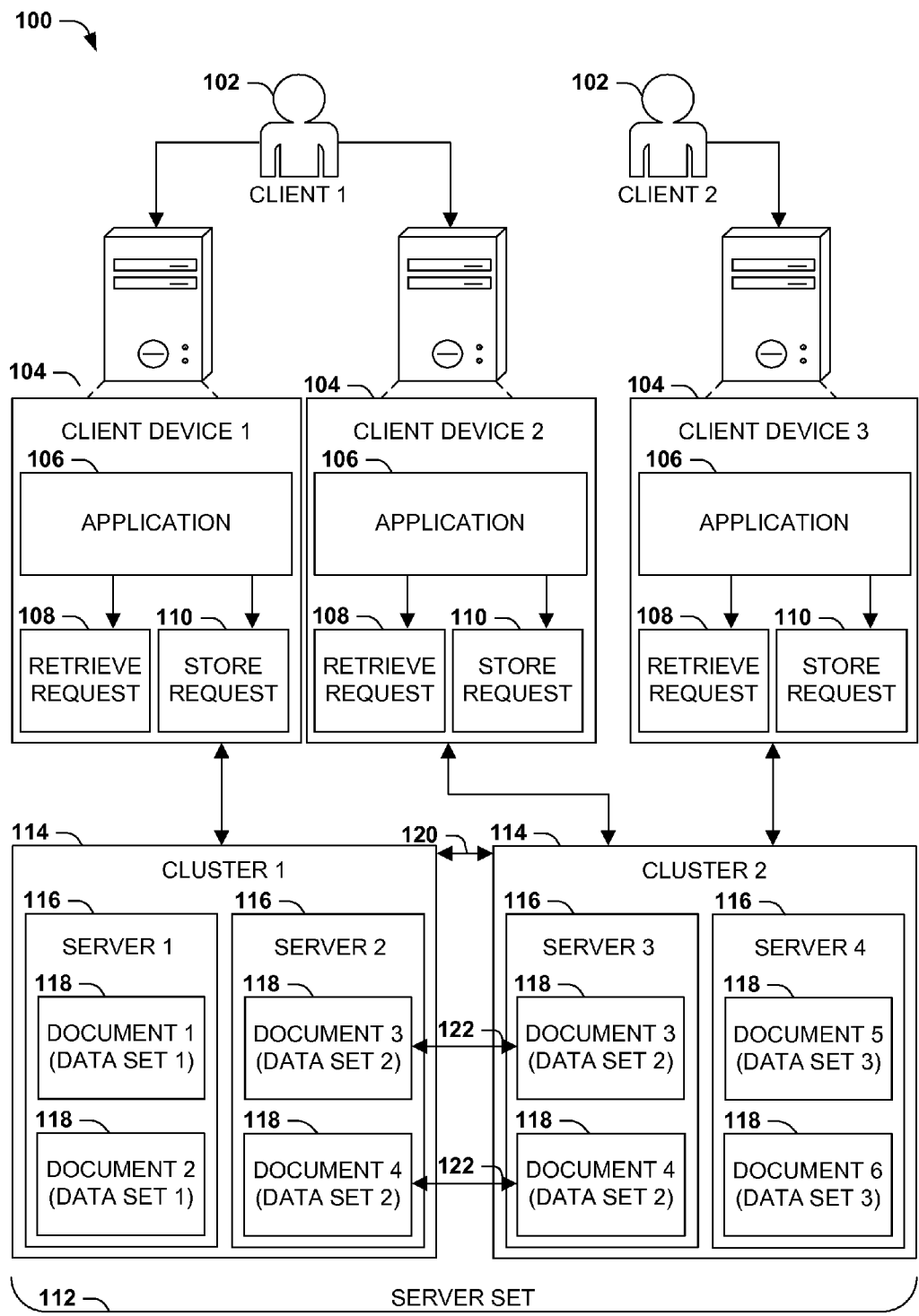
FIG. 1 is an illustration of an exemplary scenario featuring an exemplary document service provided by a set of servers to a set of users.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve a document set comprising at least one document, where respective documents comprise data that may be structured in some manner. As a first example, the documents may comprise the records within the tables of a database. As a second example, the records may comprise objects in an object-oriented computing environment. As a third example, the records may comprise elements structured according to a hierarchical format, such as a variant of the Extensible Markup Language (XML) or JavaScript Object Notation (JSON) hierarchical formats. The document set may be provided by a set of servers on behalf of one or more clients, each of which may involve one or more users operating one or more devices executing one or more applications that interact with the documents of the document service.

In such scenarios, the configuration of the servers may be selected to provide a document service with various characteristics. As a first example, the servers may be configured to distribute the documents of the document set in various ways; e.g., the document set may be evenly distributed over the servers, may be redundantly distributed over the servers, or may be distributed such that particular servers store particular subsets of related documents of the document set. As a second example, the server set may feature varying degrees of replication in order to facilitate fault tolerance (e.g., two or more servers may store replicas of a document, such that a document remains available from the first server even if the second server fails or becomes corrupted) and/or performance (e.g., requests for a document may be fulfilled by either of two or more servers respectively storing replicas of the document). As a third example, the server set may be partitioned into clusters, based on various logical considerations (e.g., security domains, network topologies, or the allocation of different servers into different roles) and/or physical considerations (e.g., distribution of the servers in different racks, rooms, buildings, or geographic regions). As a fourth example, the server set may provide the document service to two or more clients, and may apply security policies in order to provide access of a particular data set to the users of a first client while prohibiting such access to the users of a second client. As a fifth example, the server set may feature various types and levels of communication among the servers in order to share information and coordinate the document service in light of various configuration events arising within the server set, such as the addition, removal, or reconfiguration of one or more servers or document sets. As a sixth example, some configurations may promote the flexibility of the server set (e.g., providing rapid and easy reconfiguration of servers or changes to a document set), while other configurations may constrain such flexibility (e.g., exhibiting a delay, involving extensive reconfiguration, or creating unexpected consequences in response to such changes).

In view of these and other considerations, an administrator of the server set may configure a server set to provide a document service according to various architectures, where each architecture comprises a selection among the variety of computing resources for each aspect of the server set. For example, each architecture may feature a particular network topology; network configuration techniques, such as the protocols used to communicate information among the servers regarding network configuration changes; network routing algorithms for exchanging information among the servers; distribution algorithms for distributing the document set over the servers; and partitioning techniques to ensure the application of security and access policies. Moreover, respective architectures may exhibit various characteristics, such as scalability, availability, performance, fault tolerance, efficiency, flexibility, security, and cost, as compared with other architectures, and that the selection of a particular architecture for a particular document service to be provided by a particular server set may be difficult in view of the extensive set of options and tradeoffs.

FIG. 1 presents an illustration of an exemplary scenario 100 featuring the provision of a document service on behalf of a set of clients 102. Respective clients 102 may comprise, e.g., individuals, sets of individuals, organizations, companies, or governments, and may respectively utilize a set of client devices 104 that execute one or more client applications 106 for and through which the document service is to be provided for the clients 102. For example, respective client applications 106 may issue a set of requests (such as retrieve requests 108 to retrieve a document 118 and/or store requests 110 to store a document 118) to a server set 112, comprising a set of one or more servers 116 organized into one or more clusters 114, and respectively configured to store one or more documents 118. For example, a first cluster 114 may comprise a first server 116 and a second server 116, each storing a set of documents 118 comprising part or all of the document set of the first client 102. Additionally, a second cluster 114 comprising a third server 116 and a fourth server 116, each of which may also store documents 118 on behalf of the first client 102, as well as a second client 102. The clusters 114 may also interoperate 120 to synchronize changes to the document set among the servers 116. For example, the third server 116 may store a set of replicas 112 of respective documents 118 stored in the first cluster 114, such that if one of the second server 116 and the third server 116 becomes unavailable or corrupted, the other of the second server 116 and the third server 116 may remain available to provide the documents 118. Additionally, the fourth server 116 may store and provide a fifth document 118 and a sixth document 118 for the second client 102. Such servers 116 may also be allocated as a dedicated server 116 that stores and serves documents 118 to only one client 102, or a shared server 116 that stores and serves documents 118 to two or more clients 102, optionally in view of various security policies (e.g., enabling process isolation of processes interacting with the documents 118 of the first client 102 and documents 118 of the second client 102, such that neither client 102 may invoke a process that interacts with the documents 118 or other resources of a different client 102). The clusters 114 may also be selected and configured in view of various characteristics of the exemplary scenario 100 (e.g., respective clusters 114 may store subsets of interrelated documents 118 that are often used together, such that the servers 116 may be more tightly coupled to provide efficient communication thereamong; or respective clusters 114 may be geographically distributed, such that the first cluster 114 may efficiently service a first client device 104 in a first geographic region while the second cluster 114 services a second client device 104 in a second geographic region).

In view of these and other properties of the server set 112, it may be appreciated that a wide variety of architectures exist that may be capable of providing a document service for a particular server set 112 on behalf of a particular set of clients 102 utilizing various client devices 104 and client applications 106. Respective architectures may result in various properties and/or tradeoffs of the server set 112, and an administrator may have difficulty choosing among the large set of available options to suit a particular server set 112 and document service. Moreover, it may be difficult for an administrator to reconfigure the server set after selecting an initial architecture. As a first example, altering the distribution of the documents 118 among the servers 116 may involve a relocation of a potentially large set documents 118 from a first server 206 to a second server 206. During this time, the involved documents 118 may be unavailable to the client 102 for whom the document service is being provided; because the documents 118 may not be reliably located, and/or because changes to a document 118 may fail to persist (e.g., if the document 118 has already been copied to a different server 116); and/or because related resources, such as indices, may have to be rebuilt. Thus, changes to the document set may result in extensive complications and down time for part or all of the document service. As a second example, it may be difficult to scale out the servers 116 of a cluster 114 in a particular manner. For example, some document distribution techniques may provide only limited options for specifying the distribution on a particular server 116 of a cluster 114. Thus, an administrator may wish to add one or more servers 116 on behalf of a particular client 102; to provide expanded capacity for a particular document set; or to add replicas 112 of some documents 118 stored by particular other servers 116. However, the document distribution manager may fill the servers 116 with documents 118 from several clients 102 participating in the document service. These and other limitations may arise from limited flexibility of the document service due to the architecture selected for the server set 112.

B. Presented Techniques

Presented herein are various architectures for a server set 112 that is capable of providing a document service with an appealing set of advantageous properties. In accordance with these architectures, respective servers 116 of a server set 112 may be configured to share a document set by partitioning the documents 118 into document ranges. For example, a mechanism may be provided to identify a numeric identifier of respective documents 118, such as a hashcode, and the document ranges may involve particular ranges of hashcodes. Additionally, each server 116 may be configured to execute one or more agents, where each agent is selected to service the documents 118 within one or more document ranges. Moreover, requests to apply one or more operations to one or more documents 118 may be performed by the agents associated with the document ranges of the documents 118. Respective servers 116 may therefore either invoke an agent hosted thereby to apply the operation to locally hosted documents 118, or forward the operation to another server 116 that is hosting such an agent. This architecture may facilitate many desirable characteristics of the configuration and performance of the server set 112 and the resulting document service.

Figure 2:
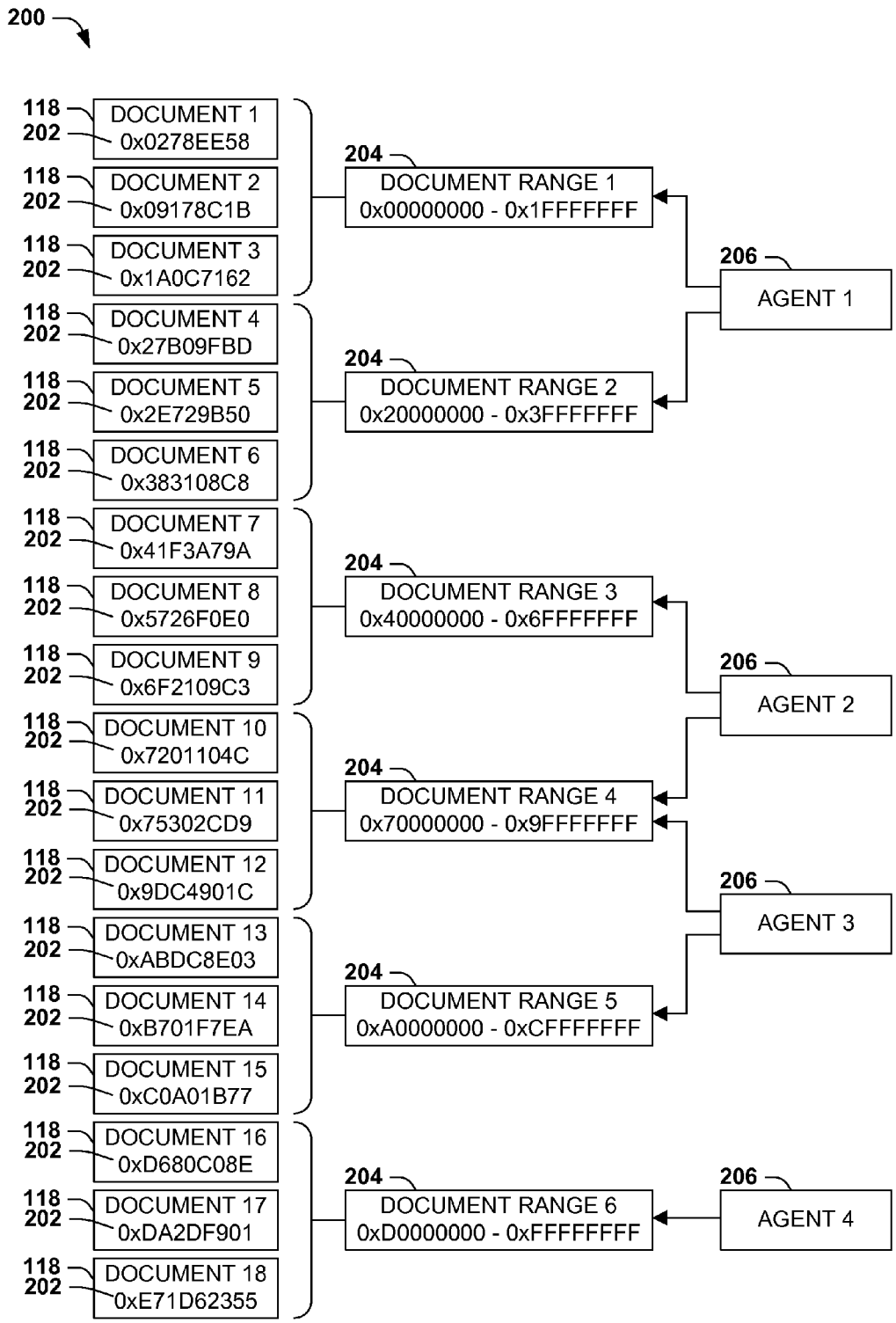
FIG. 2 is an illustration of an exemplary scenario featuring an assignment of document ranges of a document set to one or more agents.

FIG. 2 presents an illustration of an exemplary scenario 200 featuring the partitioning of the documents 118 of a document service over a set of document ranges 204. In this exemplary scenario 200, for each document 118, a document identifier 202 is associated with the document 118, such as a sequentially or randomly assigned unique integer, a hashcode computed from one or more properties of the document 118, a globally unique identifier (GUID), or a universally unique identifier (UUID). Additionally, a set of document ranges 204 may be identified, each document range 204 specifying a range of identifiers 204 of documents 118 within the document range 204. Additionally, respective agents 206 may be assigned to one or more document ranges 204. Such assignments may be selected based on many considerations. As a first such example, a first document range 204 involving a particularly valuable or high-demand set of documents 118 may be assigned to two or more agents 206 (such as the assignment of the second agent 206 and the third agent 206 to cover the fourth document range 204). As a second such example, an agent 206 may be exclusively assigned a single document range 204 in order to provide tighter control over the service of the documents 118 within this document range 204 (such as the assignment of the fourth agent 206 only to the sixth document range 206). As a third such example, the assignments of the agents 206 may be selected in order to balance the load of each agent 206, based on such considerations as the numbers, sizes, and access patterns of documents 118 within each document range 204. Many such partitionings of documents 118 into document ranges 204 and/or assignments of document ranges 204 to agents 206 may be selected.

Figure 3:
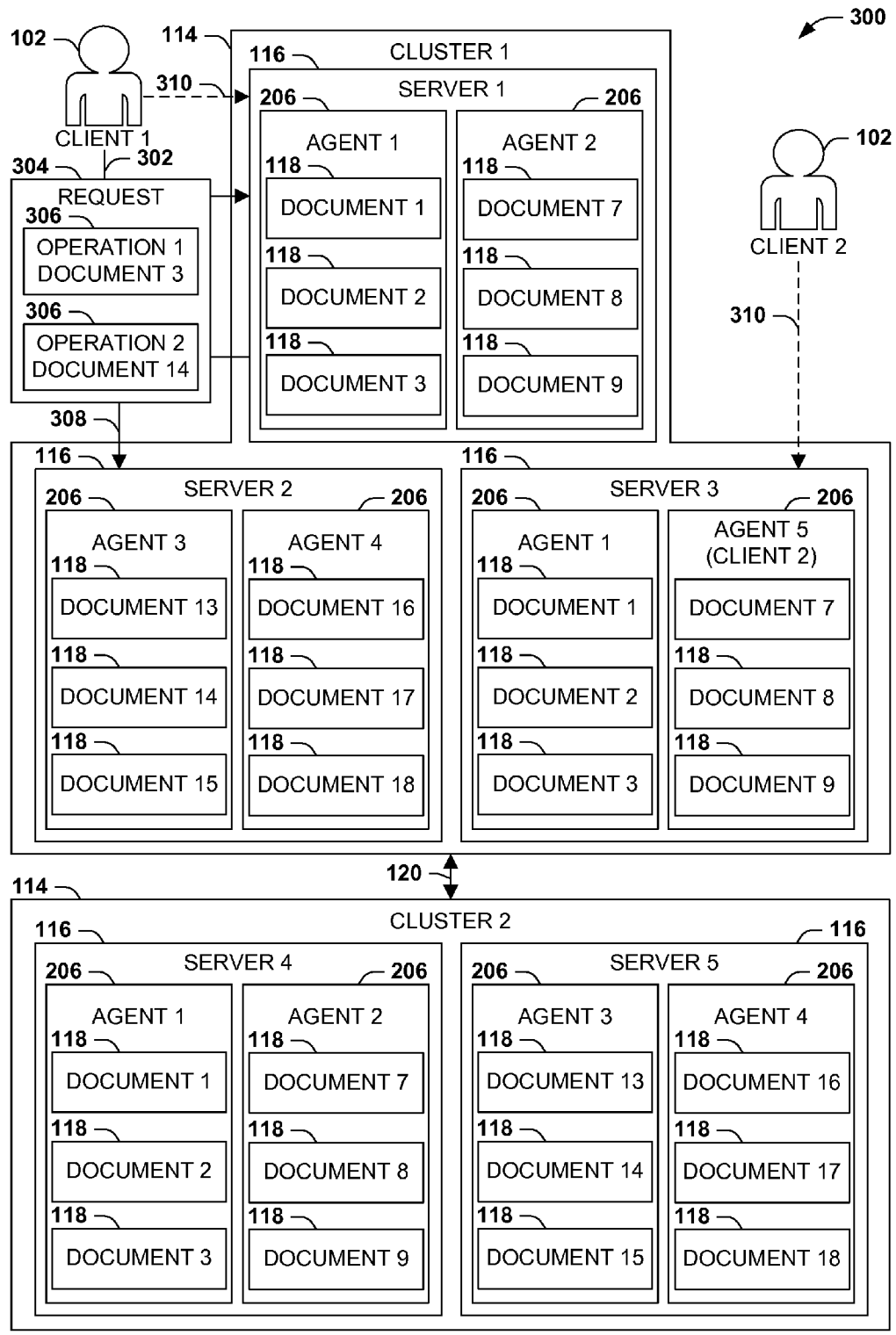
FIG. 3 is an illustration of an exemplary scenario featuring an exemplary document service provided by a set of servers to a set of users in accordance with the techniques presented herein.

FIG. 3 presents an illustration of an exemplary scenario 300 featuring the service of a document set that has been partitioned into document ranges 204 (such as in the exemplary scenario 200 of FIG. 2). In this exemplary scenario 300, the servers 116 are organized into two clusters 114 that interoperate 120 to provide a document service to a set of clients 102. Respective servers 116 may execute one or more agents 206, each of which is assigned a document range 204, and each of which stores and manages documents 118 within the document ranges 204 assigned to the agent 206. The servers 116 interoperate to distribute the documents 118 according to the document ranges 204. For example, a first client 102 may utilize a client device 104 executing an application 106 that initiates a series of requests 304 to perform various operations 306 on documents 118 of the document service (such as a retrieve request 108 to retrieve a document 118, and a store request 110 to store a document 118). The client device 104 may submit 302 the request 304 to a server 116 within a cluster 114 of the server set 112 (and, in some embodiments, may submit the request 304 to any server 116 of the server set 112). The server 116 receiving the request 304 may examine the operation 306, identify the documents 118 involved in the request 304, and compare the document ranges 204 of the selected documents 118 with the document ranges 204 assigned to the agents 206 hosted by the server 116. If any agent 206 hosted by the server 116 has been assigned a document range 204 for documents 118 involved in the operation 306, the server 116 may invoke the selected agent 206 to apply the operation 306 to the document 118. However, if the server 116 does not host such an agent 206, the server 116 may attempt to forward the operation 306 to a second server 116 of the server set 112 that is hosting such an agent 206.

For example, in the exemplary scenario 300 of FIG. 3, the first server 116 hosts a first agent 206 and a second agent 206, each having the assignments of document ranges 204 illustrated in the exemplary scenario 200 of FIG. 2. When the first client 102 submits 302 a request 304 to the first server 116, the first server 116 determines that the first operation 306 involves the third document 118 that is within the first document range 204 assigned to the first agent 206 hosted on the first server 116, and therefore invokes the first agent 206 to apply the first operation 306 to the third document 118. However, the second operation 306 included in the request 304 involves a second operation 306 involving the fourteenth document 118, which is within the fifth document range 204 that is assigned to the third agent 206, and the first server 116 does not host the third agent 206. Instead, the server 116 may determine that the second server 116 hosts the third agent 206, and may forward 308 the second operation 306 to the second server 116 for application to the fourteenth document 118 managed by the third agent 206 hosted by the second server 116. In this manner, the server set 112 may interoperate to provide the document service to the clients 102 in accordance with the techniques presented herein.

The architecture and techniques illustrated in the exemplary scenario 300 of FIG. 3 may enable various advantages in the configuration of the server set as compared with other architectures and other techniques. As a first example, the document set may be partitioned into comparatively narrow document ranges 204 (thus including a smaller number of documents and enabling finer-grain control over the assignment of subsets of the document set to the agents 206) or comparatively broad document ranges 204 (thus promoting scalability through a greater capacity of documents per document range 204). As a second example, the hosting of agents 206 on servers 116 may provide a flexible and efficient mechanism for achieving load distribution, parallelization, and responsibility determination. For example, respective servers 116 may be assigned a number of agents 206 proportional with the computational resources of the server 116, and the computational demands of each agent 206 (e.g., an agent 206 assigned to a high-demand document range 204 may be hosted by a server 116 that is wholly or largely dedicated to the agent 206, while several document ranges 204 that are in low demand may be assigned to one or more agents 206 that are hosted by the same server 116). As a third example, the hosting of agents 206 to servers 116 may facilitate the portability of the agents 206 and the reassignment of computational load; e.g., a first server 116 that is overburdened may transfer one or more of its hosted agent 206 to a second server 116 that has computational capacity, thus offloading computational load without significant reconfiguration of either server 116. As a fourth example, operations 306 involving a document 118 may be executed on a server 116 hosting an agent 206 hosting the document 118, thus enabling a tight coupling of the execution of operations 306 and the documents 118 involved therein, and reducing interactions between a first server 116 executing the operation 306 and a second server 116 hosting the documents 118 of the operation. As a fifth example, this architecture enables flexible scale-out; e.g., a server 116 that is added to a cluster 114 may be assigned one or more agents 206 that are dedicated to a particular client 102 and/or that are assigned to document ranges 204 for a particular data set, or may share a first agent 206 hosted on behalf of a first client 102 and a second agent 206 hosted on behalf of a second client 102. This flexibility thus enables convenient provisioning of respective servers 116 of the server set 112 for particular uses, which may be difficult to specify in other architectures. As a sixth example, this architecture enables the convenient application of security policies; e.g., respective agents 206 assigned to manage the documents 116 of a particular client 102 may execute within a process isolation model and with the credentials and privileges of the client 102, and respective agents 206 may be isolated from other agents 206 executing on behalf of other clients 102. These and other advantages may be achievable through the configuration of a server set 112 to provide a document service according to the techniques and architectures presented herein.

C. Exemplary Embodiments

Figure 4:
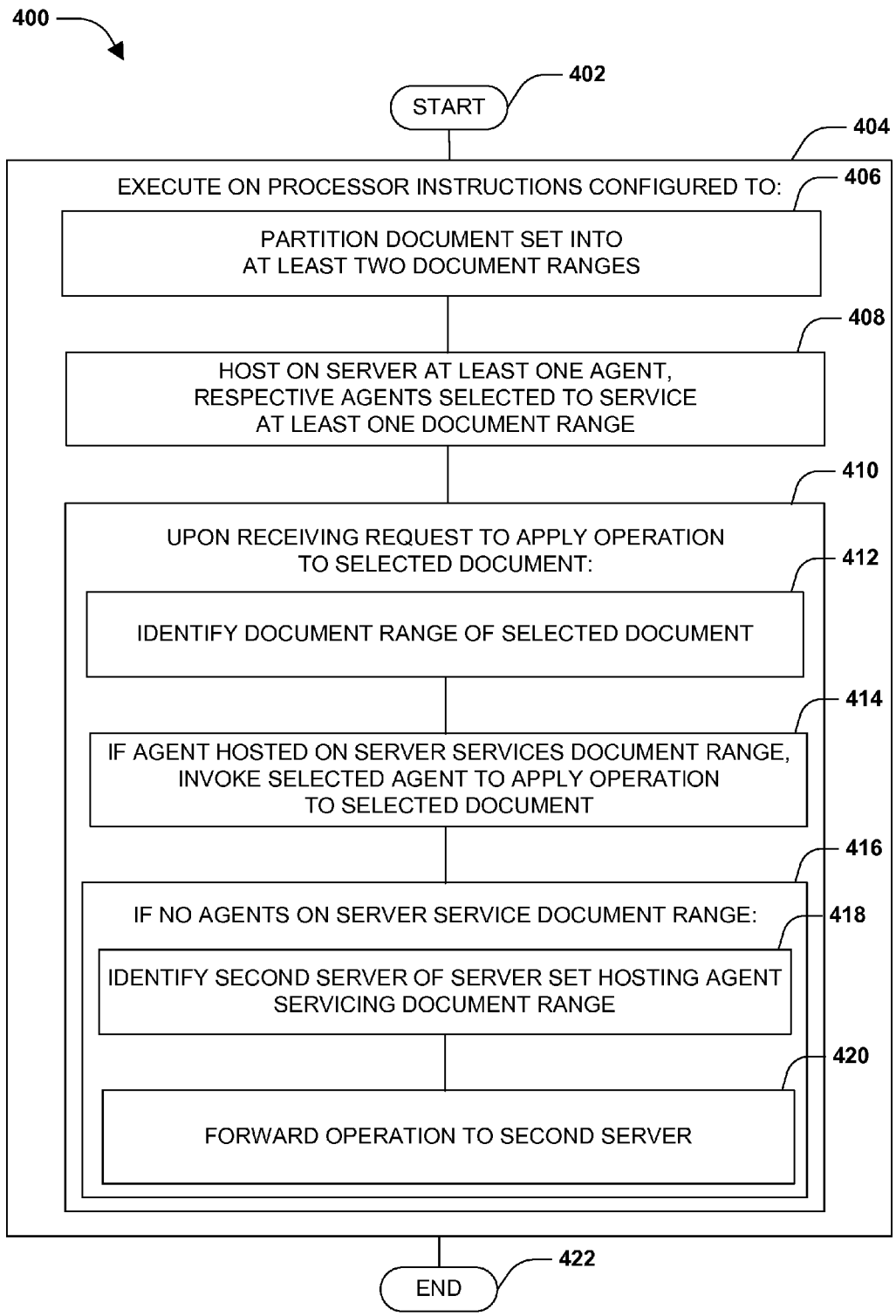
FIG. 4 is an illustration of an exemplary method of provisioning a server to serve a document set comprising at least one document on a server having a processor and included in a server set in accordance with the techniques presented herein.

FIG. 4 presents a first exemplary embodiment of the techniques presented herein, illustrated as an exemplary method 400 of provisioning a server 116 to participate in a document service of a document set provided by a server set 112. The exemplary method 400 may be implemented, e.g., as a set of instructions stored in a memory component of the server 116, such as a memory circuit, a platter of a hard disk drive, a solid-state storage device, or a magnetic or optical disc, and organized such that, when executed by the server 116 (e.g., on a processor of the server 116), cause the server 116 to operate according to the techniques presented herein. The exemplary method 400 begins at 402 and involves executing 404 the instructions on a processor of the server 116. Specifically, these instructions may be configured to partition 406 the document set into at least two document ranges 204. The instructions may also be configured to host 408 on the server 116 at least one agent 206, where respective agents 206 hosted on the server 116 are selected to service at least one document range 204. The instructions may also be configured to, upon receiving 410 a request to apply an operation 306 to a selected document 118, identify 412 the document range 204 of the selected document 118. The instructions may also be configured to, if this determination results in the identification of a selected agent 206 hosted on the server 116 that services the document range 204, invoke 414 the selected agent 206 to apply the operation 306 to the selected document 118; and if 416 no agents 206 on the server 116 service the document range 204, identify 418 a second server 116 of the server set 112 hosting an agent 206 servicing the document range 204, and forward 420 the operation 306 to the second server 116. Having achieved the configuration of the server 116 to participate in the document service according to the architectures and techniques presented herein, the exemplary method 400 achieves the techniques presented herein, and so ends at 422.

Figure 5:
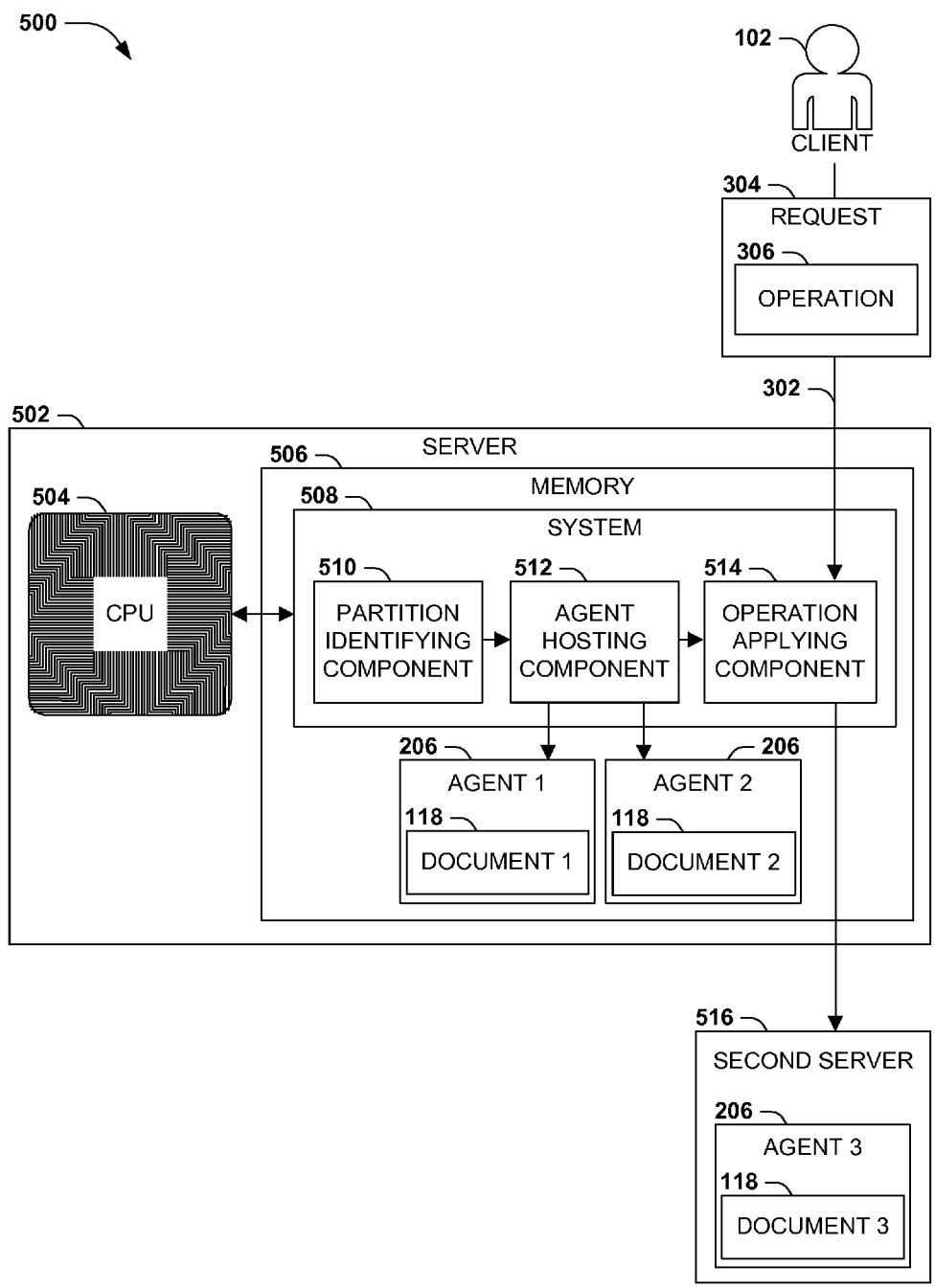
FIG. 5 is a component block diagram illustrating an exemplary system for provisioning a server to serve a document set comprising at least one document on a server having a processor and included in a server set in accordance with the techniques presented herein.

FIG. 5 presents a second exemplary embodiment of the techniques presented herein, illustrated as an exemplary scenario 500 featuring an exemplary system 508 for provisioning a server 502 having a processor 504 and a memory 506 to participate in a document service of a document set provided by a server set 112. Respective components of the exemplary system 508 may be implemented, e.g., as a set of instructions stored in a memory 506 of the server 502 and executable on a processor 504 of the server 502, such that the interoperation of the components causes the server 502 to operate according to the techniques presented herein. The exemplary system 508 comprises a partition identifying component 510 that partitions the document set into at least two document ranges 204. The exemplary system 508 further comprises an agent hosting component 512 that coordinates the hosting on the server 502 of at least one agent 206, where respective agents 206 hosted on the server 502 are selected to service at least one document range 204 of the document set, including storing the documents 118 of the document range 204 of the document set and applying requested operations 306 to the documents 18. The exemplary system 508 further comprises an operation applying component 514 that, upon receiving a request to apply an operation 306 to a selected document 118, identifies the document range 204 of the selected document 118. If a selected agent 206 hosted on the server 502 services the document range 204, the operation applying component 514 invokes the selected agent 206 to apply the operation 306 to the selected document 118; and if no agents 206 on the server 502 service the document range 204, the operation applying component 514 identifies a second server 116 of the server set 112 hosting an agent 206 servicing the document range 204, and forwards the operation 306 to the second server 116. In this manner, the exemplary system 508 achieves within the server 502 the application of the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
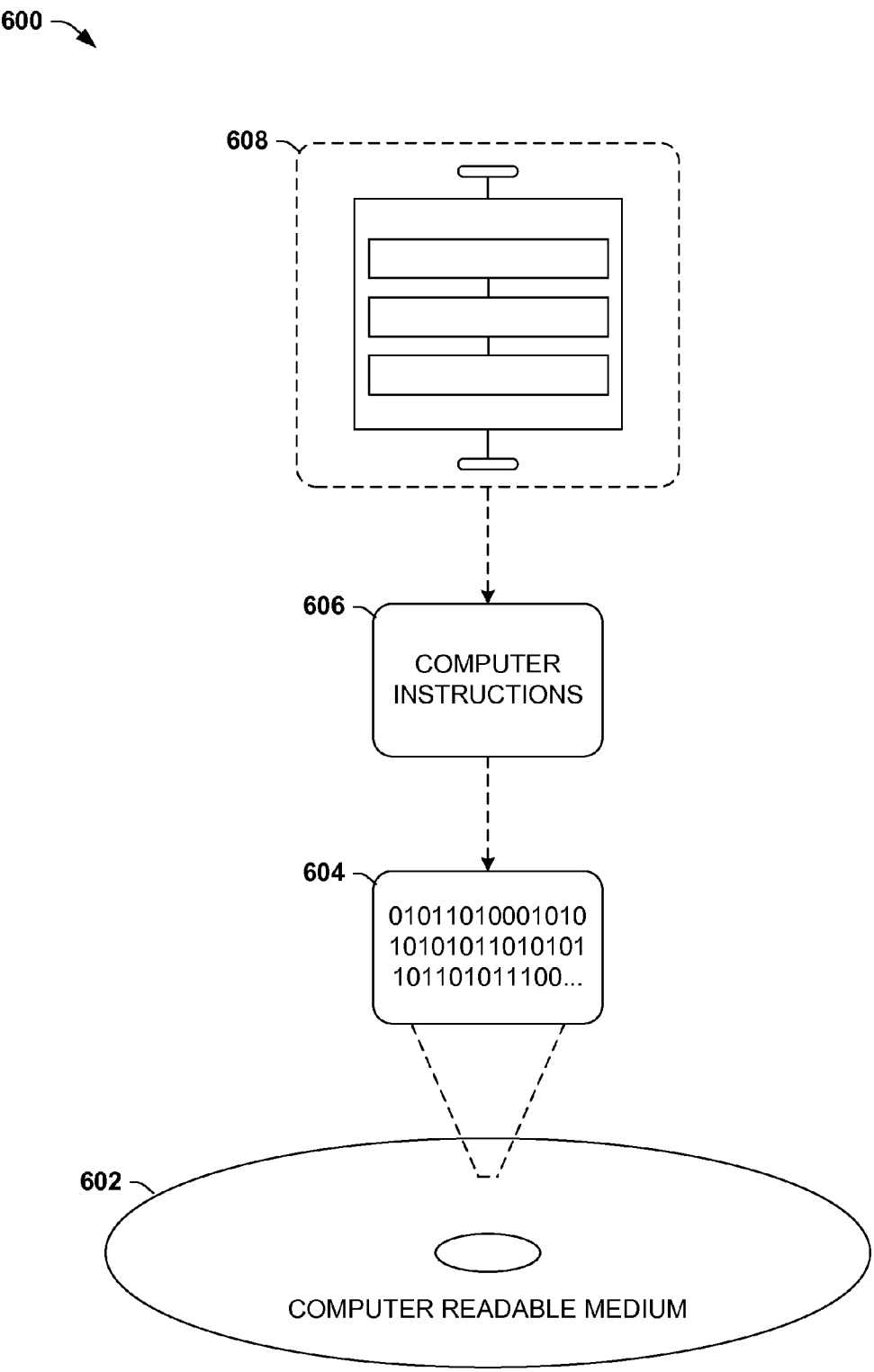
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 600 comprises a computer-readable medium 602 (e.g., a CD-R, DVD-R, or a platter of a hard disk drive), on which is encoded computer-readable data 604. This computer-readable data 604 in turn comprises a set of computer instructions 606 configured to operate according to the principles set forth herein. In one such embodiment, the processor-executable instructions 606 may be configured to perform a method 608 of configuring a server 116 to participate in a document service, such as the exemplary method 400 of FIG. 4. In another such embodiment, the processor-executable instructions 606 may be configured to implement a system for configuring a server 116 to participate in a document service, such as the exemplary system 508 of FIG. 5. Some embodiments of this computer-readable medium may comprise a computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 400 of FIG. 4 and the exemplary system 508 of FIG. 5) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of client devices 104, such as servers, server farms, workstations, laptops, tablets, mobile phones, game consoles, and network appliances. Such client devices 104 may also provide a variety of computing components, such as wired or wireless communications devices; human input devices, such as keyboards, mice, touchpads, touch-sensitive displays, microphones, and gesture-based input components; automated input devices, such as still or motion cameras, global positioning service (GPS) devices, and other sensors; output devices such as displays and speakers; and communication devices, such as wired and/or wireless network components.

As a second variation of this first aspect, the servers 116 hosting the document service may comprise many types of server devices, including workstations, rack-mounted servers, massively parallel processors, and sets of consumer devices. Such servers may also be organized into clusters 114 according to various network architectures, such as a hierarchical domain architecture or a token-ring network architecture, or may be loosely organized, such as through a dynamic host configuration protocol (DHCP)-serviced network. Additionally, such servers 116 may be configured in various server set architectures, such as peer-to-peer, centralized, or role-based configurations, and may be provisioned to service clients 102 in various ways, such as a collection of dedicated servers 116 respectively provisioned for a single client 102; shared servers 116 respectively provisioned for two or more clients 102; and a mixture thereof.

As a third variation of this first aspect, the documents 118 of the document service may comprise many types of information, such as records in a database; human-readable documents in a library; objects in an object-oriented computing environment; and media objects comprising various forms of renderable media. The documents 118 may also be utilized by many types of applications 106, such as data-driven applications accessing the data as structured information; object-oriented applications that utilize objects respectively represented by a document 118 in the document set; and library or media interfaces configured to present or render the documents 118 for a user. These and other variations may be suitable for implementations of the techniques presented herein.

D2. Document Set Partitioning

A second aspect that may vary among embodiments of the techniques presented herein relates to the types of criteria that may be specified in queries 516 for application to a document set 104.

As a first variation of this second aspect, the provisioning of the document set into document ranges 204 may be selected in various ways, e.g., an arbitrary selection of documents 118 for respective document ranges 204; a selection of topically related documents 118; and a selection of interrelated documents 118 that may be targeted together by a particular operation 306.

As a second variation of this second aspect, the documents 118 may be associated with document ranges 204 in various ways. As one example, respective document 118 may comprise a document identifier 202, and respective document ranges 204 may specify a document identifier range, such as a starting document identifier and an ending document identifier that represent the bounds of the document range 204. Among the range of document identifiers 202, the document set may be partitioned into at least two document identifier ranges; and any document 118 having a document identifier 202 within the document identifier range may be identified as associated with the document range 204.

As a third variation of this second aspect, the document identifiers 202 may be arbitrarily assigned to the document 118. For example, the document identifiers 202 may comprise a sequentially or randomly unique integer assigned to the document 118 upon document creation; a hashcode computed over some data or metadata of the document 118; or a globally unique identifier (GUID), or a universally unique identifier (UUID). In some scenarios, it may be desirable to choose the document identifiers 202 are unchanged by changes to the contents of the documents 118 (e.g., computing a hashcode using only document properties that do not change), so that references to the document 118 in other documents 118 or applications 106 according to the document identifier 202 of the document 118 remain accurate.

As a fourth variation of this second aspect, the partitions of the document set into document ranges may be selected in various ways. As a first example of this fourth variation, the document ranges may be selected arbitrarily; e.g., in the exemplary scenario 200 of FIG. 2, the document ranges comprise arbitrarily selected identifier ranges, such as 0x00000000-0x1FFFFFFF. As a second example of this fourth variation, the document ranges may be selected that represent comparatively equivalent load balances; e.g., a first document range may include a small number of documents 118 or a narrow document identifier range, if such documents 118 are predicted to be frequently accessed, whereas a second document range may include a large number of documents 118 or a wide document identifier range, if such documents are predicted to be infrequently accessed.

As a third example of this fourth variation, the document ranges may have semantic significance; e.g., a document range may be selected for a particular set of related documents 118, such as interrelated documents 118 or documents 118 that refer to a particular topic. However, in such scenarios, changes to the contents of a document 118 may result in a change to the document identifier 202, and potentially involving a relocation of the document 118 from a first server 116 to a second server 116 hosting an agent 206 that is associated with the document range 204 of the new identifier. Conversely, if the document ranges 204 have semantic significance, changes to the contents or metadata of a document 118 may change the document range 204 in which the document 118 is to be included (e.g., shifting the document 118 from a first document range 204 for a first set of interrelated documents to a second document range 204 for a second set of interrelated documents). In such scenarios, the document identifier 202 of the document 118 may be altered to associate the document 118 with the second document range 204. Alternatively, the partitioning may be altered such that the document identifier 202 of the document 118 is not changed, but is now associated with the second document range 204 instead of the first document range 204, thereby enabling both an association of documents 118 with semantically significant document ranges 204 and also a portability of documents 118 among such document ranges 204 without altering the document identifiers 202 of the documents 118.

One such technique for enabling the association of document identifiers 202 with document ranges 204 involves the generation of a partitioning map that identifies, for respective document identifier ranges, the agent 206 hosting the document identifier range, and, optionally, one or more servers 116 hosting such agents 206. Respective servers 116 may therefore be configured to identify the document range 204 of a particular document 118 by examining the partitioning map to identify the agent 206 assigned to a document identifier range that includes the document identifier 202 of the selected document 118. Additionally, the partitioning map may be updated to reflect changes in the partitioning for particular documents 118. For example, upon receiving a reassignment of a selected document 118 from a first agent 206 identified by the partitioning map to a second agent 118, the server 116 may generate an updated partitioning map that identifies the second agent 206 reassigned to service the selected document 118, and may distribute the updated partitioning map to at least one other server 116 of the server set 112. In this manner, the server set 112 may provide the association of documents 118 with document ranges 204 in a flexible manner that avoids altering the document identifiers 202 of the documents 118.

Figure 7:
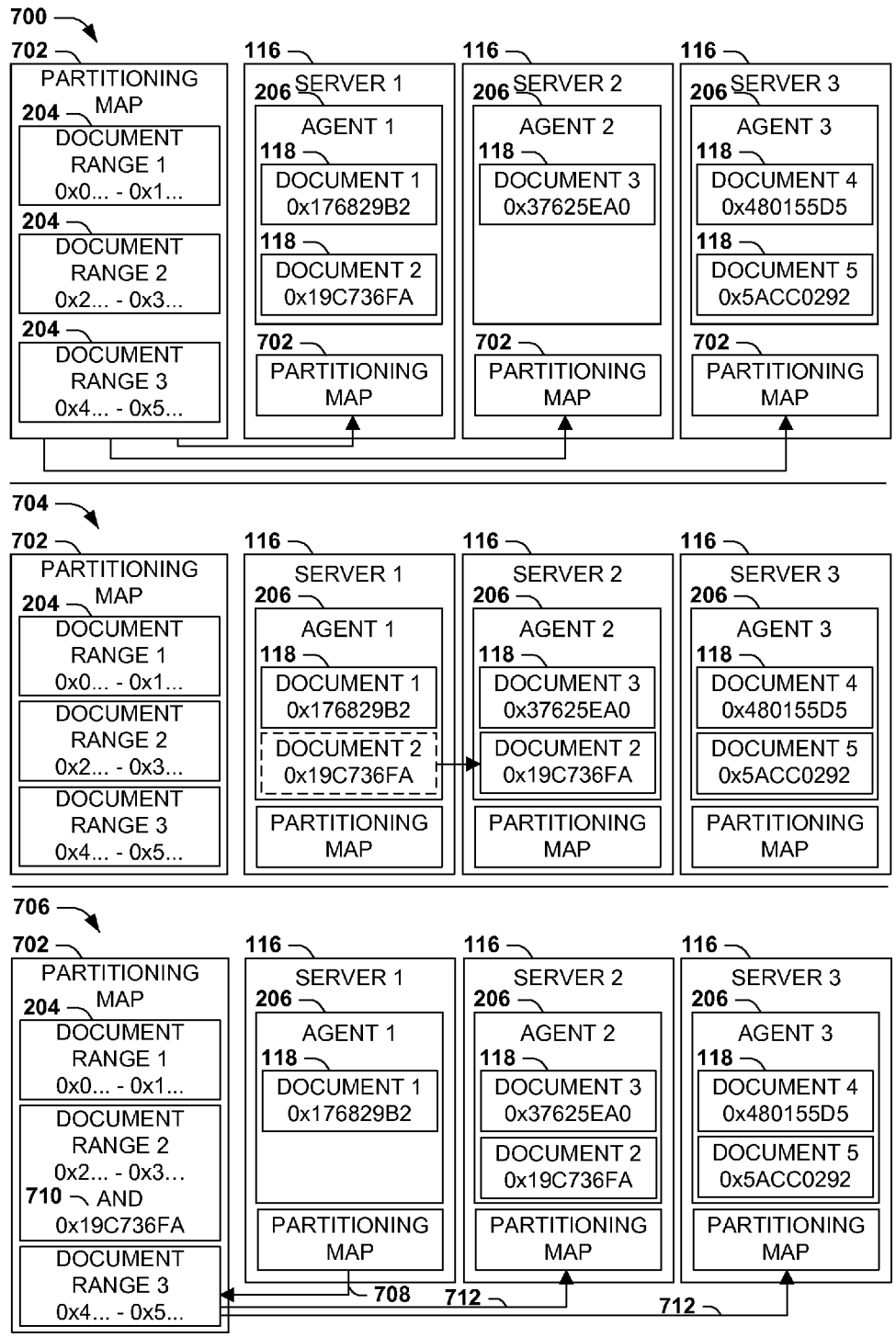
FIG. 7 is an illustration of an exemplary scenario featuring the mapping of documents to document ranges according to a partitioning map.

FIG. 7 presents an illustration of an exemplary scenario featuring the use of a partitioning map 702 to associate documents 118 with document ranges 204. In this exemplary scenario, a first time point 700, a set of servers 116 may respectively host at least one agent 206 that is servicing a document range 204, and may provide the document service for the documents 118 having document identifiers 202 within the assigned document range(s) 204. Additionally, respective servers 116 may share a partitioning map 702 that specifies the document ranges 204 according to document identifier ranges, and may additionally specify the manner of computing the document identifiers 202 for respective documents 118 (e.g., a GUID or UUID generating function, or a hashing function that is initially used to generate an initial hashcode for each document 118 at the time of creation). Accordingly, each document 118 may initially be stored by a server 116 hosting the agent 206 that is assigned to the document identifier range including the document identifier 202 of the document 118. However, at a second time point 702, the second document 118 is relocated from the first agent 206 hosted by the first server 116 to a second agent 206 hosted by the second server 116. Rather than altering the document identifier 202 of the document 118, the servers 116 may instead alter 710 the partitioning map 702 to indicate the relocation of the second document 118. For example, at a third time point 706, the first server 116 alters 708 the partitioning map 702 to specify not only the documents 118 having document identifiers 202 within the specified document identifier range, but also an explicit assignment 710 of the second document range 204 to include the document identifier 202 of the second document 118. After altering 710 the partition map 702, the first server 116 may share the updated partitioning map 702 with the second server 116 and the third server 116, which may thereafter find the second document 118 through the partitioning map 702 as being managed by the second agent 206 on the second server 116. In this manner, the server set 112 may enable the relocation of documents 118 among the document ranges 204 without altering the document identifiers 202 of the documents 118 in accordance with the techniques presented herein.

D3. Server Set Architecture

A third aspect that may vary among embodiments of these techniques involves the architecture of the server set 112, which may be selected to enable or facilitate various features of the document service.

As a first variation of this third aspect, respective servers 116 and agents 206 may be allocated in various ways. For example, the allocation may be selected arbitrarily or naïvely; e.g., the document set may be partitioned in to proportional document ranges 204 and assigned in proportional measure to the agents 206, which may be distributed proportionally over the hosting servers 116. Alternatively, the assignment of document ranges 204 to agents 206 and/or hosting of agents 206 by servers 116 may be selected in view of various considerations of the document service and/or server set 112. As a first such example, the server set 112 may provide documents 118 associated with at least two document sets, which may be distinguished by topic, by interrelationships among the documents 118, and/or by the clients 102 or applications 106 for which the documents 118 are hosted. Respective servers 116 may be assigned to a server role selected from a server role set comprising a dedicated server that hosts only agents 306 servicing the documents 118 of a selected document set (e.g., exclusively servicing the documents 118 of a particular topic, a particular group of interrelated documents 118, or for a particular client 102 or application 106), and a shared server that concurrently hosts a first agent 306 servicing documents 118 of a first document set and a second agent 306 servicing documents 118 of a second document set. The optional assignment of server roles may be selected by an administrator, or may be automatically selected based on various heuristics. In one such embodiment, the selection of server roles is based on a service level agreement associated with a document set; e.g., the document service may desirably exhibit particular service characteristics (such as capacity, availability, reliability, throughput, or latency) for a particular client 102 as identified by a service level agreement, and the selection of roles for servers 116 may be selected to fulfill the service level agreements of the document sets comprising the document service.

As a second variation of this third aspect, the architecture of the server set 112 may enable various levels of reliability, fault tolerance, performance, and/or scalability. To this end, the server set may include at least two agents 206 that share at least one document range 204; e.g., a first agent 206 hosted on a first server 116 may service a document range 204 of a document set replica that is also hosted by a second agent 206 hosted on a second server 116, such that either agent 206 remains available to provide the documents 118 if the other agent 206 and/or server 116 becomes unresponsive. The agents 206 may synchronize updates to the documents 118 within the document set replica, and/or may share the computational load of applying operations 306 to the documents 118 within the document range 204 of the document set replica. Such document set replicas may be advantageous in many scenarios (e.g., where the first server 116 is hosted in a first geographic region, and the second server 116 is hosted in a second geographic region that is not near the first geographic region), such that each server 116 may fulfill requests received from clients 102 and devices 104 within the respective geographic regions.

As a third variation of this third aspect, the architecture of the server set 112 may enable a redistribution of computational load of the document service, and may adjust to fluctuations in order to maintain acceptable performance. For example, respective servers 116 may measure a first computational load applied to the server 116, and may compare the first computational load applied to the server 116 with a second computational load applied to a second server 116 of the server set 112 (e.g., the number of documents 118 serviced by each server 116, the network capacity and bandwidth utilization of each server 116, and/or the processing consumed by the agents 206 of each server 116). If significant and persistent differences in computational load are identified, the servers 116 may interoperate to redistribute the computational load in various ways. As a first example, the first server 116 may transfer one or more agents 206 to the second server 116. As a second example, the servers 116 may repartition at least one document range 204 serviced by at least one agent 206 hosted by at least one of the servers 116 into an updated document range. These and other features may be achievable through the architecture of the server set 112 in accordance with the techniques presented herein.

D4. Server Coordination and Routing

A fourth aspect that may vary among implementations of the techniques presented herein involves the configuration of a server 116 to identify a second server 116 hosting an agent 206 managing the document range 204 of one or more documents 118 to which an operation 306 is to be applied, and the routing of operations 306 among the servers 116 of the server set 112.

As a first variation of this fourth aspect, a centralized directory or server may be utilized that tracks the hosting of agents 206 by servers 116 and/or the document ranges 204 associated with respective agents 206. For example, in order to forward an operation 306 to an agent 206 hosted by another server 116, a server 116 may contact an agent locating service with a request to identify an address of a second server 116 hosting an agent 206 selected to service the document range 204 of the documents 118 involved in the operation 306, and, upon receiving the address from the agent locating service, may forward the operation 306 to the address of the second server 116. Additionally, these queries may be facilitated by an agent locating cache provided on the server 116 to associate respective document ranges 204 with an address of another server 116 of the server set 112 hosting at least one agent 206 servicing the document range 204. Upon receiving the address of the second server 116, the server 116 may store the address of the second server in the agent locating cache; and when endeavoring to forward an operation 306 to another server 116, the server 116 may search the agent locating cache for the address of the second server 116 before sending the request to the agent locating service. However, in some scenarios, it may be undesirable to centralize the location of respective servers 116 (e.g., in an extensive and frequently changing server set 112, the agent locating service may become overloaded or may provide incorrect or stale information). Accordingly, it may be desirable to provide a less centralized technique that provides more efficient communication among the servers 116 of the server set 112.

As a second variation of this fourth aspect, respective servers 116 may be configured to store and share information about the servers 116 of the server set 112 and the agents 206 hosted thereupon, and to use such information to forward operations 306 to servers 116 hosting agents 206 that are capable of performing such operations. In particular, it may be desirable to select techniques that enable an efficient determination of such servers 116 in order to reduce the amount of coordination involved in routing an operation 306 to an appropriate server 116. However, it may also be desirable to reduce the volume of communication among the servers 116 in coordinating such information.

One such set of techniques involves arranging the servers in a particular logical configuration, such as in a hierarchy or a ring topology, where respective servers 116 may have a degree of proximity to each other server 116 in the server set 112. In some such embodiments, the organization may reflect the organization of document ranges 204 and/or the physical proximity and relationships of the servers 116. Additionally, respective servers 116 may be configured to store more information about neighboring servers that are near the server 116 in the logical configuration, and to store less information about distant servers that are not near the server 116 in the logical configuration. This configuration may enable an efficient local communication among a neighborhood of servers 116, and efficient but reduced communication between pairs of distant servers 116.

Such configurations may also facilitate efficient routing of operations 306 among the servers 116. For example, a server 116 may receive a request 304 comprising an operation 306 involving a document 118 having a document identifier 202 that is not serviced by the agents 206 hosted on the server 116, and may endeavor to identify and forward the operation 306 to an appropriate second server 116. If the document identifier 202 is within a document identifier range that is near the server 116 (e.g., of a second server 116 within the server neighborhood of the server 116), then the server 116 may have sufficient information to route the operation 306 directly to the second server 116. However, if the document identifier 202 is not within a document identifier range that is near the server 116, then the server 116 may have scant information about the distant servers 116 that provide an approximation of the appropriate distant server 116 for the operation 306. Even if the distant server 116 to which the server 116 forwards the operation 306 is also not hosting an agent 206 associated with the document range 204 of the documents 118 involved in the operation 306, the distant server may be near a third server 116 that is hosting such an agent 206 (e.g., the third server 116 may be within the server neighborhood of the distant server), and the distant server may be able to forward the operation 306 to the third server 116 hosting the agent 206. In this manner, the routing of operations 306 among the servers 116 may be efficiently achieved with a desirable balance of decentralization and conservation of communication.

Figure 8:
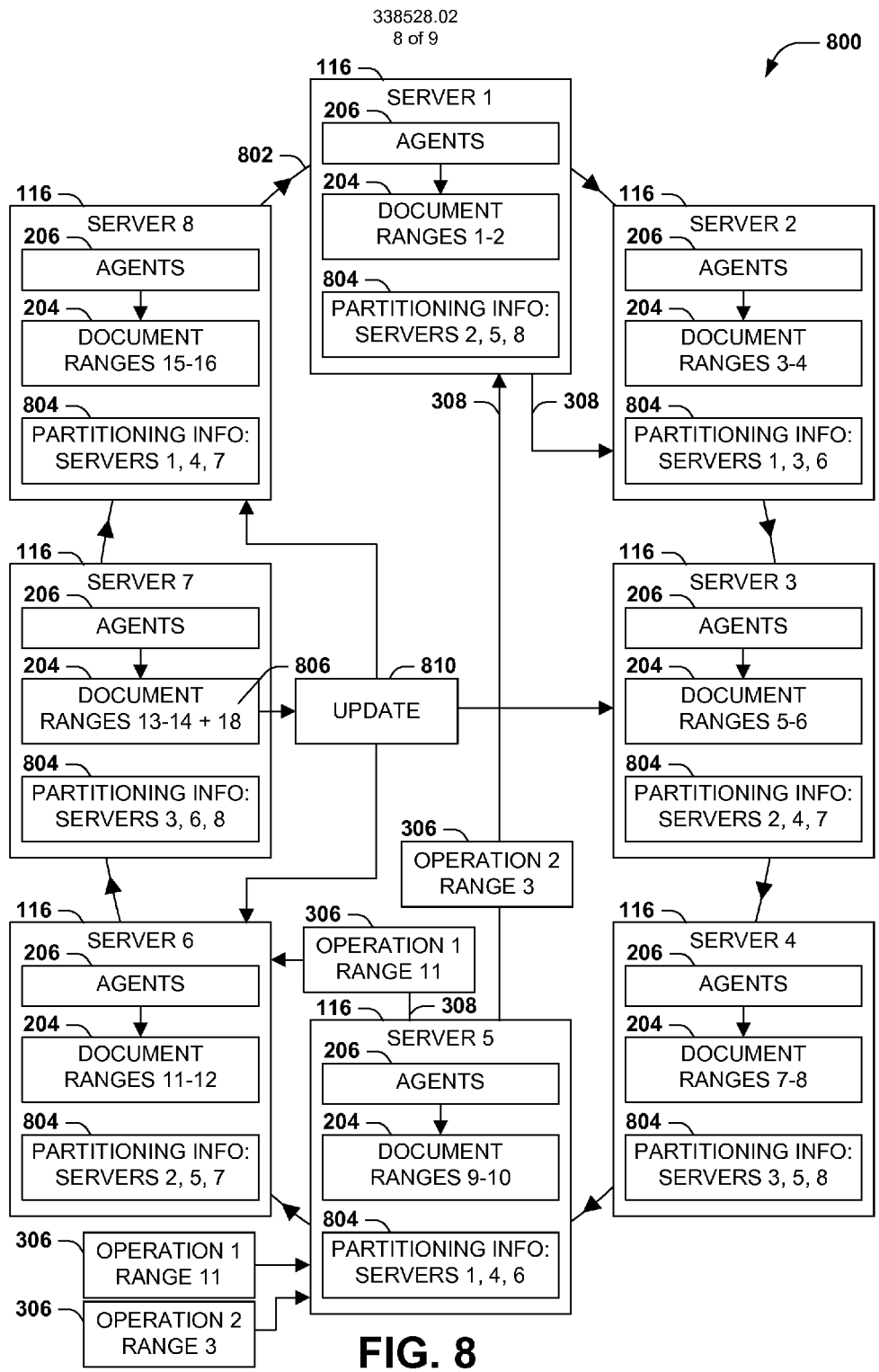
FIG. 8 is an illustration of an exemplary scenario featuring techniques for efficiently routing operations among servers organized according to a ring topology.

FIG. 8 presents an illustration of an exemplary scenario 800 featuring a set of servers 116 organized to provide a document service, and to route operations 306 involving a document range 204 to a server 116 hosting an agent 206 servicing the document range 204, in accordance with some variations of this fourth aspect. In this exemplary scenario 800, the servers 116 are arranged in a ring topology 802, such as an ordering of the servers 116 reflecting the document ranges 204 assigned to the agents 206 hosted by each server 116. Additionally, respective servers 116 may store partitioning information 804 about other servers 116, where such partitioning information 804 stored by respective servers 116 includes detailed information about the nearby servers 116 within the server neighborhood of the respective server 116 according to the ring topology 802 (e.g., the neighboring servers 116 that are adjacent to the server 116), and also scant information about one or more distant servers 116 that are not near the server 116 according to the ring topology 802. Accordingly, if a document range 204 is altered 806 (e.g., the assignment of an additional document range 204 to an agent 206 of the seventh server 116), the server 116 may notify the other servers 116 within the server neighborhood of the server 116, and also one or more distant servers 116 (e.g., the seventh server 116 may send an update 810 to the neighboring sixth server 116 and eighth server 116, and also the third server 116). In this manner, the update 810 of the partitioning information 804 may be limited to distributed only for a few other servers 116, rather than notifying many or all servers 116 of the server set 112.

As further illustrated in the exemplary scenario 800 of FIG. 8, when a server 116 receives a request 304 including one or more operation 306 that pertains to document ranges 204 not managed by the agents 206 hosted on the server 116, the server 116 my refer to the partitioning information 804 to identify a second server 116 to which the operation 306 may be forwarded. For example, the fifth server 116 may receive a request including a first operation 306 involving a document range 306 that is managed by an agent 206 of a neighboring server 116 (e.g., the sixth server). Because the fifth server 116 stores detailed information about the sixth server 116 in the partitioning information 804, the fifth server 116 may accurately forward 308 the operation 306 to the sixth server 116. Alternatively, when the fifth server 116 receives a second operation 306 specifying a document range 204 that is stored by a distant server 116, the fifth server 116 may be unable to determine precisely which distant server 116 of the server set 112 hosts a suitable agent 206 (e.g., the second server 116). However, the fifth server 116 may store partitioning information 804 identifying a distant server 116 that is at least closer to the appropriate server 116 (e.g., an address of the first server 116 that is distant from the fifth server 116 in the ring topology 802, but that may comprise a neighboring server within the server neighborhood of the appropriate other server 116), and may forward 308 the operation 306 to the first server 116. The first server 116 may include detailed partitioning information 804 about its server neighborhood, including the document ranges 204 assigned to the agents 206 of the second server 116, and therefore may forward the second operation 306 directly to the third server 116 for application by the agents 206 to the documents 118 within the specified document ranges 204. In this manner, the servers 116 may interoperate to route operations 306 efficiently to other servers 116 of the server set 112.

As a third variation of this fourth aspect, additional variations in the server coordination and routing may be achievable within the server set 112. As a first such variation, the partitions of the document set and/or hosting of agents 206 may be adjusted to reflect changes in the server set 112. As a first such example, upon joining the server set 112, a new server 116 may be assigned a particular location in the ring topology between two other neighboring servers 116. The new server 116 may join the ring topology by interoperating with the neighboring servers 116 to repartition at least one document range 204 serviced by at least one agent 206 hosted by the neighboring server 116, such that the new server 116 may instantiate an agent 206 with an assignment to part of the document range 204.

As a second example of this third variation, respective servers 116 may be configured to adapt to the failure of other servers 116 of the server set 112. As a first such example, upon attempting to forward an operation 306 to a neighboring server 116 but failing to contact the neighboring server 116 due to a server or network failure, the server 116 may repartition the document ranges 204 serviced by the agents 206 hosted by the neighboring server 116 (e.g., either accepting assignment of the document ranges 204 and instantiating one or more agents 206 to handle the document ranges 204 formerly assigned to the failed neighboring server 116). This reassignment may involve collaboration with a second neighboring server 116; e.g., the server 116 and the second neighboring server 116 may interoperate to split the document ranges 204 formerly assigned to the failed neighboring server 116 between the two servers 116. As a second such example, upon failing to contact a second server 116 that is not in the server neighborhood of the server 116, the server 116 may identifying a neighboring server that is near the second server 116 (e.g., according to the ring topology 802), and forward the operation 306 to the neighboring server, which may perform the repartitioning of the document ranges 204 formerly assigned to the failed server. These and other variations in the interoperation of the servers 116 of the server set 112 may enable or facilitate many such features of the server set 112 and the document service in accordance with the techniques presented herein.

E. Computing Environment

Figure 9:
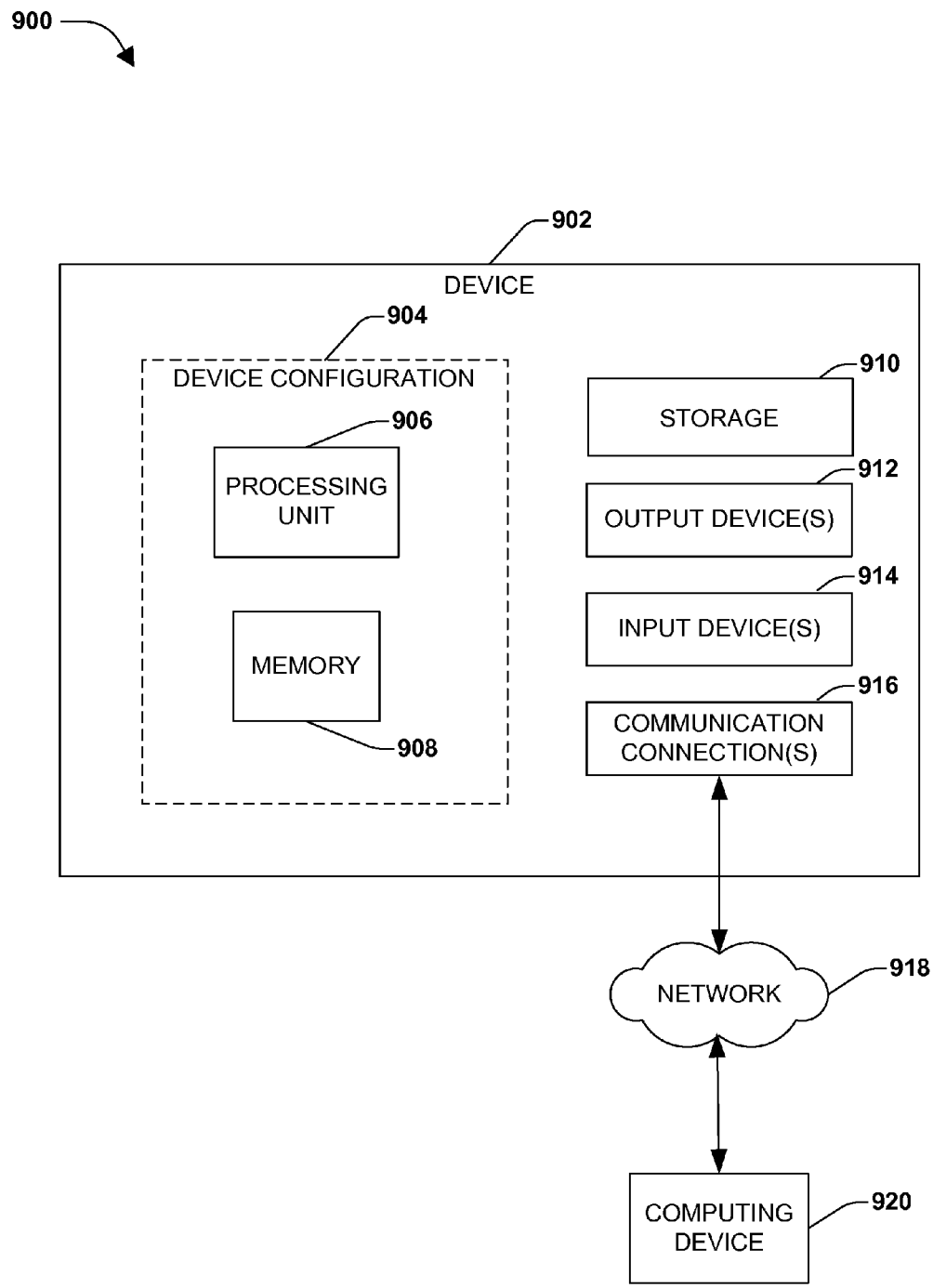
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of provisioning a server having a processor to participate in a document service of a document set by a server set, the method comprising:
    partitioning the document set into at least two document ranges;
    assigning respective document ranges to an agent that is deployable to any server of the service set to service documents within the document range;
    hosting on the server at least one agent; and
    fulfilling a request to apply an operation to a selected document by:
        identifying the document range of the selected document;
        if a selected agent hosted on the server services the document range, invoking the selected agent to apply the operation to the selected document; and
        if no agents on the server service the document range:
            identifying a second server of the server set hosting an agent servicing the document range; and
            forwarding the operation to the second server.

2. The method of claim 1:
    respective documents comprising a document identifier;
    partitioning the document set comprising: partitioning the document set into at least two document identifier ranges; and
    identifying the document range of the selected document comprising: identifying the document identifier range comprising the document identifier of the selected document.

3. The method of claim 1, wherein identifying the second server further comprises:

sending to an agent locating service a request to identify an address of a second server hosting an agent selected to service the document range; and forwarding the operation to the address of the second server provided by the agent locating service.

4. The method of claim 3, wherein:

the server comprising an agent locating cache associating respective document ranges with an address of a server hosting at least one agent servicing the document range; and the method further comprises:

receiving the address of the second server, store in the agent locating cache the address of the second server hosting an agent associated with the document range; and sending the operation to the agent locating service comprising: before sending the operation to the agent locating service, searching the agent locating cache for the address of the second server.

5. The method of claim 2:

partitioning the document set further comprising: generating a partitioning map identifying, for respective document identifier ranges, the agent hosting the document identifier range; and identifying the document range of a selected document comprising: examining the partitioning map to identify the agent hosting the document identifier range including the document identifier of the selected document.

6. The method of claim 5, further comprising:

receiving a reassignment of a selected document from the agent identified by the partitioning map to a second agent;

generating an updated partitioning map identifying the second agent reassigned to service the selected document; and distributing the updated partitioning map to at least one second server.

7. The method of claim 1:

the server set servicing the documents of at least two document sets;

the server assigned to a server role comprising:

a dedicated server hosting only the agents servicing the documents of a selected document set; and a shared server hosting a first agent servicing at least one document of a first document set and a second agent servicing at least one document of a second document set.

8. The method of claim 7, wherein:

respective document sets are associated with a service level agreement; and the method further comprising: selecting the server role of the server to satisfy the service level agreement of at least one document set.

9. The method of claim 1, the server hosting a first agent servicing a document range of a document set replica that is redundantly serviced by a second agent on a second server.

10. The method of claim 9:

the server hosted in a first geographic region; and the second server hosted in a second geographic region that is not near the first geographic region.

11. The method of claim 1, further comprising:

measuring a first computational load applied to the server; and in view of the first computational load and a second computational load applied to a second server of the server set, repartitioning at least one document range serviced by an agent hosted by one of the server and the second server between the server and the second server into an updated document range.

12. The method of claim 1, the document set partitioned across the servers of the server set according to a ring topology.

13. The method of claim 12, further comprising:

identifying at least one neighbor document range serviced by an agent hosted by a neighboring server that is near the server in the ring topology; and identifying at least one distant document range serviced by an agent hosted by a distant server that is not near the server in the ring topology.

14. The method of claim 13, further comprising:

receiving a request involving a document having a document identifier that is not serviced by the agents hosted on the server;

among the at least one neighbor document range and the at least one distant document range, identifying a second server hosting an agent servicing a selected document range that is near the document identifier; and forwarding the operation to the second server.

15. The method of claim 14, wherein forwarding the operation to the second server further comprises: handling a failure to contact a second server that is not near the server in the ring topology by:

identifying a neighboring server that is near the second server in the ring topology; and forwarding the operation to the neighboring server.

16. The method of claim 14, wherein forwarding the operation to the second server further comprises: handling a failure to contact a neighboring server by repartitioning the document ranges serviced by the agents hosted by the neighboring server.

17. The method of claim 16, repartitioning the document range comprising:

identifying a second neighboring server that is near the neighboring server; and repartitioning the document range between the server and the second neighboring server.

18. The method of claim 13, further comprising:

joining the server set in the ring topology;

identifying at least one neighboring server that is near the server in the ring topology; and repartitioning at least one document range serviced by at least one agent hosted by the neighboring server.

19. A system for provisioning a server having a processor and a memory to participate in a document service of a document set by a server set, the system comprising:

a partition identifying component comprising instructions stored in the memory, wherein execution of the instructions by the processor causes the server to:

partition the document set into at least two document ranges; and assign respective document ranges to an agent that is deployable to any server of the service set to service documents within the document range;

an agent hosting component comprising instructions stored in the memory that, when executed on the processor, cause the server to host on the server at least one agent, respective agents hosted on the server selected to service at least one document range; and an operation applying component comprising instructions stored in the memory that, when executed on the processor, cause the server to fulfill a request to apply an operation to a selected document by:

identifying the document range of the selected document;

if a selected agent hosted on the server services the document range, invoking the selected agent to apply the operation to the selected document; and if no agents on the server service the document range:
  identifying a second server of the server set hosting an agent servicing the document range; and
  forwarding the operation to the second server.

20. A server of a server set that provides a document service, the server comprising:

a processor; and a memory storing instructions, wherein execution of the instructions by the processor causes the server to:

partition the document set into at least two document ranges;

assign respective document ranges to an agent that is deployable to any server of the service set to service documents within the document range;

host on the server at least one agent, respective agents hosted on the server selected to service at least one document range; and fulfill a request to apply an operation to a selected document by:

identifying the document range of the selected document;

if a selected agent hosted on the server services the document range, invoking the selected agent to apply the operation to the selected document; and if no agents on the server service the document range:
  identifying a second server of the server set hosting an agent servicing the document range; and
  forwarding the operation to the second server.

* * * * *